Figure 1:
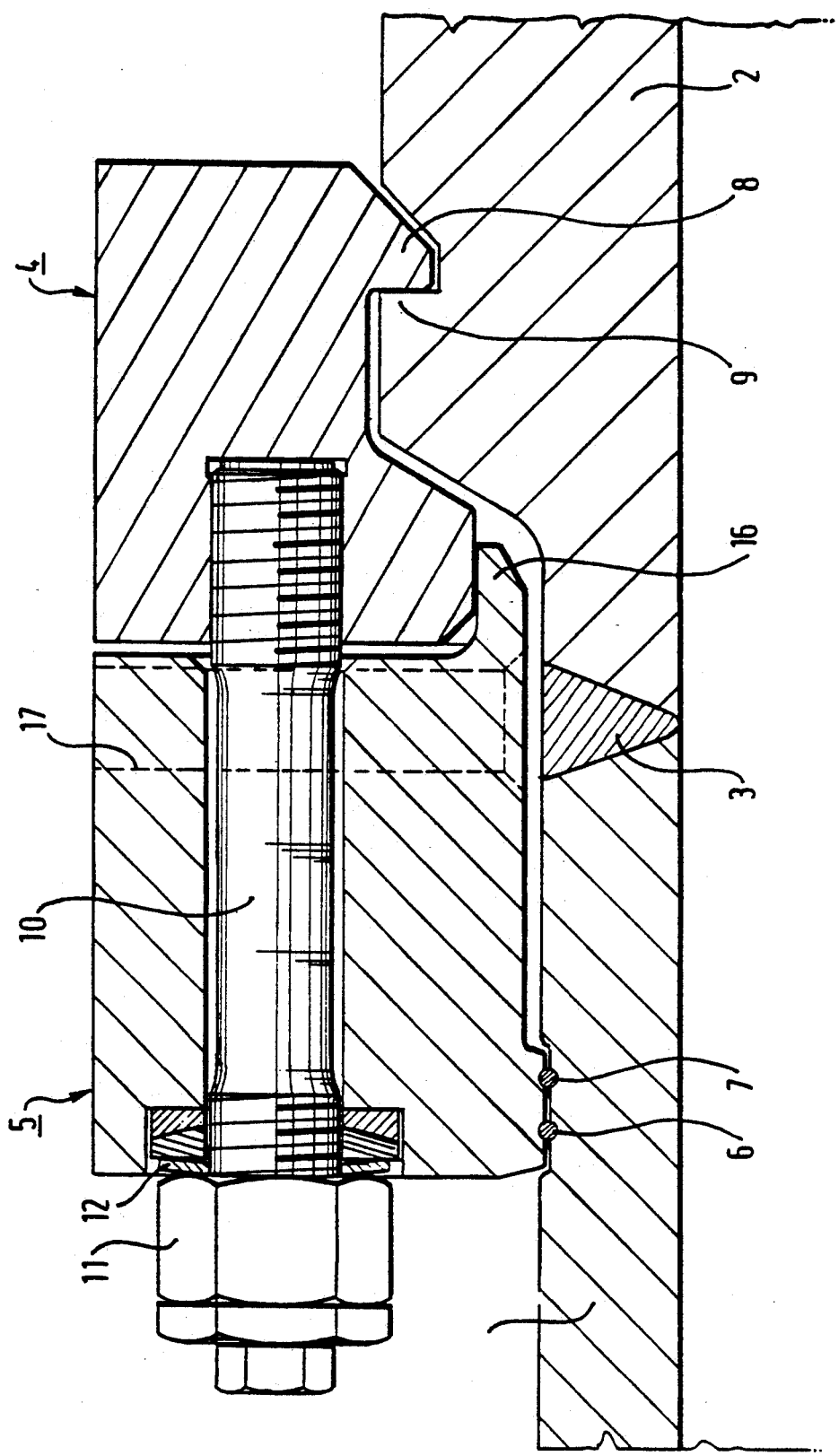

United States Patent [19]

Bioret

[11] Patent Number: 5,297,583
[45] Date of Patent: Mar. 29, 1994

[54] APPARATUS FOR LIMITING A LEAK IN THE EVENT OF A RUPTURE IN PIPEWORK

[75] Inventor: Bernard Bioret, Nantes, France
[73] Assignee: ACB, Paris, France
[21] Appl. No.: 759,371
[22] Filed: Sep. 13, 1991

[30] Foreign Application Priority Data

Sep. 13, 1990 [FR] France ............... 90 11338

[51] Int. Cl.[5] ............... F16L 55/16
[52] U.S. Cl. ............... 138/99; 138/97
[58] Field of Search ............... 138/97, 99, 103, 104, 138/109, 110; 285/13, 14, 15, 45, 114, 115, 116, 415, 368, 412

[56] References Cited

U.S. PATENT DOCUMENTS

| | | | |
|---|---|---|---|
| 478,496 | 7/1892 | Aird ............... | 285/368 |
| 1,186,324 | 6/1916 | Metzger ............... | 285/415 |
| 1,478,172 | 12/1923 | Clark ............... | 138/99 |
| 1,940,729 | 12/1933 | Pfefferle ............... | 285/13 |
| 2,009,744 | 7/1935 | Pfefferle ............... | 138/99 |
| 2,328,031 | 8/1943 | Risley ............... | 138/97 |
| 2,776,153 | 1/1957 | Smith ............... | 138/99 |
| 3,400,952 | 9/1968 | Swenson ............... | 285/114 |
| 3,966,234 | 6/1976 | Sundholm ............... | 285/415 |
| 4,074,913 | 2/1978 | Weinhold ............... | 285/114 |
| 4,448,448 | 5/1984 | Pollia ............... | 285/415 |
| 4,644,975 | 2/1987 | Fricker . | |

FOREIGN PATENT DOCUMENTS

| | | |
|---|---|---|
| 0151670 | 6/1986 | European Pat. Off. . |
| 3334836 | 4/1985 | Fed. Rep. of Germany . |
| 1373072 | 7/1963 | France ............... 285/14 |
| 7717 | of 1910 | United Kingdom . |
| 2197420 | 1/1987 | United Kingdom . |

OTHER PUBLICATIONS

French Search Report.

Primary Examiner—Harvey C. Hornsby
Assistant Examiner—Terrence R. Till
Attorney, Agent, or Firm—Sughrue, Mion, Zinn, Macpeak & Seas

[57] ABSTRACT

A device for limiting a leak in the event of a rupture in pipework (1, 2), the device being characterized in that it comprises two flanges (4, 5) mounted on the pipework on respective sides of a section (3) of the pipework to be protected, the two flanges being assembled to each other by assembly means (10, 11) including members (12) having axial resilience leaving the duct free to expand axially, each flange including means (6, 7, 8, 9) for securing it axially on the pipework, and being itself constituted merely by two half-collars (5A, 5B) that are assembled together.

6 Claims, 2 Drawing Sheets

APPARATUS FOR LIMITING A LEAK IN THE EVENT OF A RUPTURE IN PIPEWORK

The present invention relates to a device for limiting a leak in the event of a rupture in pipework.

In particular, the invention applies to situations where pipework contains a fluid under high pressure and high temperature. In the event of a circumferential rupture, e.g. at a point of weakness such as a weld and given the pressure, the two broken ends may shake, moving away from each other both axially and laterally so that the leakage cross-section can be as great as twice the cross-section of the pipework in the event of the two ends becoming completely offset from each other.

An object of the present invention is to avoid such a phenomenon by installing a device on the pipework at points that are detected as being weak or at points where weakness may be feared, the device serving to limit leakage in the event of the pipework rupturing.

Another object of the device is to impose a minimum amount of stress both on the device itself and on the duct during proper operation of the duct, thereby avoiding fatigue, and naturally, the device should be as simple as possible in construction and to assemble, and it should be cheap.

The device is designed to be capable of being installed after an installation including the pipework has been constructed.

In the present description and claims the term "pipework" is used to cover not only a duct per se, but also, for example, a portion of a tank or a storage volume that constitutes an endpiece for connection to a duct.

Thus, the present invention provides a device for limiting a leak in the event of a rupture in pipework, the device being characterized in that it comprises two flanges mounted on the pipework on respective sides of a section of the pipework to be protected, the two flanges being assembled to each other by assembly means including members having axial resilience leaving the duct free to expand axially, each flange including means for securing it axially on the pipework, and being itself constituted merely by two half-collars that are assembled together.

Advantageously, the flanges include mutually-engaging portions for performing centering and for preventing the axes of the pipework becoming offset in the event of a rupture in said section.

In order to avoid putting the flanges under pressure in the event of a leak, and in order to enable the fluid to be removed, that at least one of the two flanges is pierced by chimneys.

In a first embodiment, a flange is secured axially by means of at least one 0-ring received half in a groove in the pipework and half in a groove in the flange.

In a second embodiment, a flange is secured by means of a rim bearing against a shoulder on the pipework.

Depending on circumstances, both flanges are secured by O-rings, or else one of them is secured by an 0-ring and the other by a rim and a shoulder. A rim and a shoulder are particularly, but not necessarily, applicable to a coupling between a duct and a tank or a storage volume or a tank, where the coupling is generally provided via an endpiece belonging to the tank and having a wall that is thick, being thicker than the wall of the duct, and where there is therefore room to form a groove of sufficient depth to constitute a shoulder. In contrast, on a duct per se, the device is secured via 0-rings since this has the advantage of requiring very little substance to be removed from the pipework, and thus of weakening it very little or not at all.

According to another characteristic, radial clearance is provided between the outside diameter of the pipework and the inside diameter of a flange, at all points around the flange, thereby avoiding creating stresses due to differential expansion between the pipework and the flanges.

Figure 2:
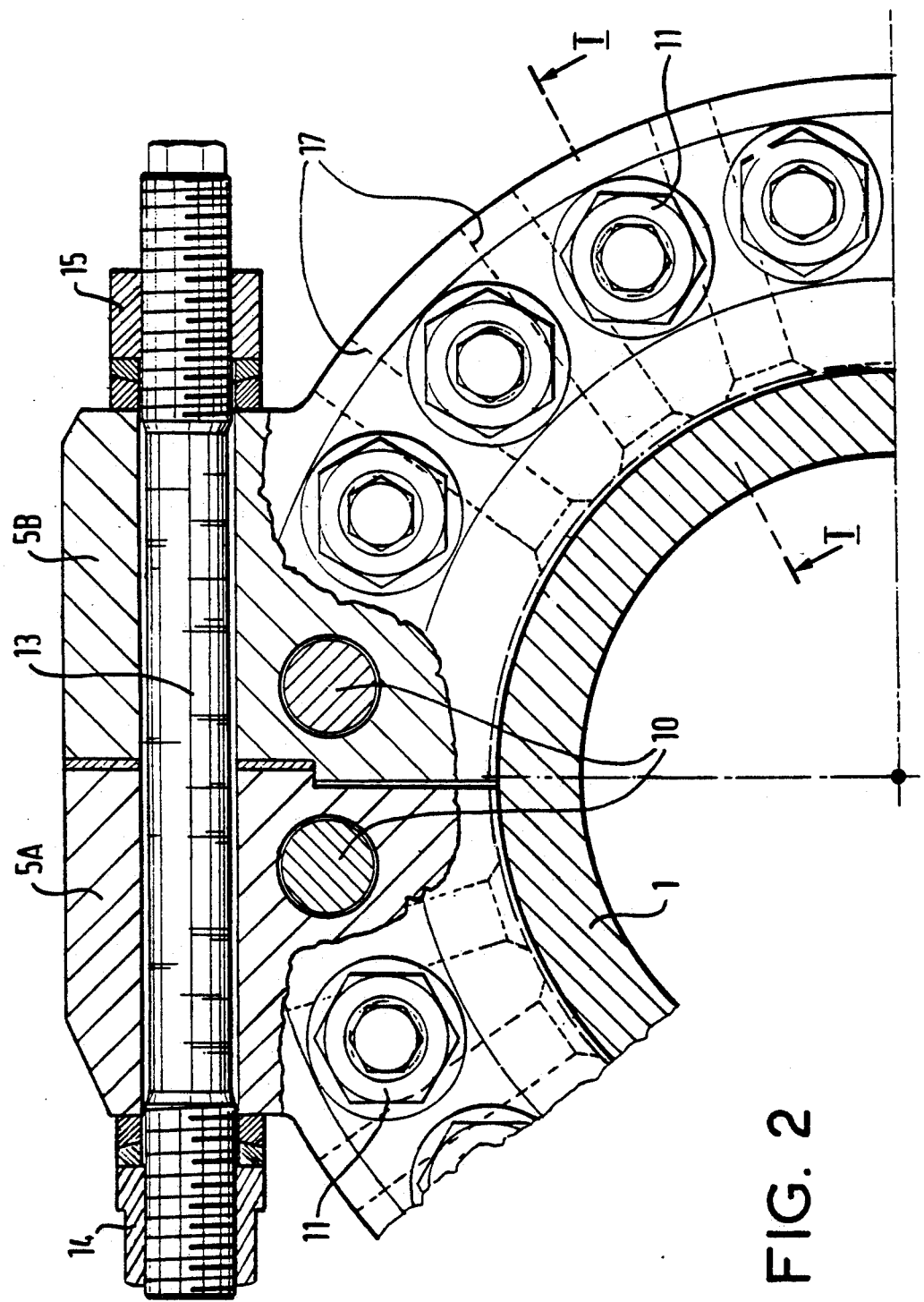

An embodiment of the invention is described below with reference to the accompanying drawings, in which:

FIG. 1 shows a device of the invention in fragmentary longitudinal section on line I—I of FIG. 2; and FIG. 2 is a partially cutaway view as seen from the left of FIG. 1, with the pipework in section.

With reference to these two figures, it can be seen that the pipework comprises a duct 1 end to end coupled to and an endpiece 2, with the duct 1 end to end sealably connected to the endpiece 2 by a weld 3. The endpiece 2 may form a portion, for example, of a tank or a storage volume and it serves specifically for connection thereof to a duct.

Two flanges are disposed on either side of the weld 3: a flange 4 to the right, and a flange 5 to the left. The flange 5 is secured axially on the pipework by means of two 0-rings 6 and 7 each of which is received half in a groove in the pipework and half in a groove in the flange 5. On the right, the flange 4 is secured axially to the pipework by means of a rim 8 bearing against a shoulder 9 of the pipework endpiece 2.

The two flanges 4 and 5 are assembled together axially by ties 10 and nuts 11 with resilient washers 12 being interposed therebetween enabling the duct to expand freely in the axial direction without giving rise to detrimental stresses and avoiding possible loosening of the nuts under the effect of vibration transmitted via the pipework. Thus, when cold, the nuts 11 are tightened so that the resilient washers 12 are not completely crushed. In normal operation, the stresses in the pipework are thus very low.

To enable the flanges to be installed, each of them is made up of two half-collars 5A, 5B which are assembled together by threaded rods 13 and nuts 14, 15.

The flange 5 has a lip 16 which is received inside the flange 4, thereby obtaining centering and preventing the axis of the duct 1 from being offset from the axis of endpiece 2 in the event of the weld 3 rupturing.

To avoid the inside of the flanges being put under pressure in the event of the weld 3 rupturing and thus giving rise to a leak, the flange 5 is pierced by chimneys 17 that allow the fluid to escape.

In normal operation of the duct, i.e. when there is no leak no stress is applied to the duct or at least as little stress as possible is applied thereto, and radial clearance is left between the outside diameter of the pipework and the inside diameter of the flanges, with this clearance existing over the entire length of both flanges, thereby leaving the flanges and the pipework free to expand differentially.

In the example described, the device is disposed over a weld 3; however, such a device may be placed at any position on pipework where weakness may be feared.

Similarly, if the device is fitted along the duct itself instead of being located as described at the connection between a duct 1 and an endpiece 2 for connection to a storage volume, then the two flanges 4 and 5 are preferably both secured by means of O-rings such as 6 and 7, since that requires little substance to be removed from the duct.

The device of the invention is effective and very simple. It is easily and quickly installed or removed, e.g. to inspect the weld ultrasonically.

Instead of being installed along pipework, the device of the invention may also be installed on a storage volume or on an apparatus.

I claim:

1. A device for permitting axial expansion of a pipework and for restricting leakage in the event of rupture of a section (3) of pipework by preventing offset of the respective axes of ruptured portions of said pipework upon rupture of the pipework at said section (3), said device comprising:

two flanges (4, 5) mounted concentrically on said pipework on respective sides of said section (3) of the pipework to be protected, each of said flanges including means for respectively fixedly securing said flanges axially on said pipework to opposite sides of said section (3), assembly means (10, 11) coupling said flanges including members (12) having axial resilience for permitting said pipework on respective sides of said section (3) to expand axially, and each flange being constituted by two half-collars (5A, 5B), assembled together and extending completely about the periphery of said pipework, whereby the portions of the pipework to respective sides of the section (3) are prevented from being thrown out of alignment in the event of rupture of the pipework at said section (3).

2. A device according to claim 1, wherein one of said flanges includes an axially projecting portion which axially overlaps a radial surface of the other one of said flanges for centering of both flanges and for preventing the respective axes of ruptured portions of said pipework from becoming offset in the event of a rupture of said section of pipework to be protected.

3. A device according to 1, wherein one of said flanges is fixedly secured axially to said pipework by means of at least one O-ring (6, 7) received half in a groove in the outer periphery of the pipework and half in a groove in the inner periphery of said one flange facing that of said pipework.

4. A device according to 7, wherein one of said flanges is secured to said pipework by means of a radially inwardly projecting rim (8) bearing longitudinally against a radial shoulder of said pipework.

5. A device according to claim 1, wherein a radial clearance is provided between the outside diameter of the pipework and the inside diameter of at least one of said flanges over the full circumference of said at least one flange.

6. A device according to claim 5, wherein at least one of said two flanges is pierced by a plurality of circumferentially spaced radial chimneys opening to said radial clearance provided between the outside diameter of the pipework and the inside diameter of said one flange.

* * * * *